(12) United States Patent
Broderick et al.

(10) Patent No.: US 7,861,520 B2
(45) Date of Patent: Jan. 4, 2011

(54) METHOD AND APPARATUS FOR REDUCING EMISSIONS IN DIESEL ENGINES

(75) Inventors: R. Gifford Broderick, Ridgefield, CT (US); Tom Eldredge, Monroe, CT (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 889 days.

(21) Appl. No.: 11/754,872

(22) Filed: May 29, 2007

(65) Prior Publication Data
US 2008/0022654 A1    Jan. 31, 2008

Related U.S. Application Data

(60) Provisional application No. 60/809,918, filed on May 31, 2006.

(51) Int. Cl.
*F01N 3/00* (2006.01)
(52) U.S. Cl. ............................. 60/286; 60/273; 60/274; 60/295; 60/301; 239/132; 425/549
(58) Field of Classification Search ................... 60/286, 60/274, 301; 239/132–132.3; 425/549; 264/328.15
See application file for complete search history.

(56) References Cited

U.S. PATENT DOCUMENTS

| | | | |
|---|---|---|---|
| 2,235,834 A | 3/1941 | Gillette et al. | 239/491 |
| 4,292,947 A | 10/1981 | Tanasawa et al. | 123/445 |
| 4,742,964 A | 5/1988 | Ito et al. | 239/397.5 |
| 4,805,837 A | 2/1989 | Brooks et al. | 239/125 |
| 5,522,218 A * | 6/1996 | Lane et al. | 60/274 |
| 5,605,042 A | 2/1997 | Stutzenberger | 60/286 |
| 5,713,327 A | 2/1998 | Tilton et al. | 123/299 |
| 5,924,280 A | 7/1999 | Tarabulski | 60/274 |
| 5,976,475 A | 11/1999 | Peter-Hoblyn et al. | 423/212 |
| 6,063,350 A | 5/2000 | Tarabulski et al. | 423/239.1 |
| 6,257,496 B1 | 7/2001 | Wyant | 239/5 |
| 6,279,603 B1 | 8/2001 | Czarnik et al. | 137/339 |
| 6,539,708 B1 | 4/2003 | Hofmann et al. | 60/286 |
| 2004/0187483 A1 * | 9/2004 | Dalla Betta et al. | 60/286 |

FOREIGN PATENT DOCUMENTS

| | | |
|---|---|---|
| DE | 24 18 227 | 10/1975 |
| DE | 24 60 111 | 7/1976 |

* cited by examiner

*Primary Examiner*—Thomas E Denion
*Assistant Examiner*—Jesse Bogue
(74) *Attorney, Agent, or Firm*—Harness, Dickey & Pierce, PLC

(57) ABSTRACT

A method of reducing emissions from a diesel engine including the steps of providing an injector to an exhaust outlet of the diesel engine, the injector having an orifice with a diameter of about 0.006 inch or less, providing a reagent to the injector at an inlet pressure between about 120 psi and about 60 psi, actuating the injector on and off at a frequency between about 10 Hz and about 1 Hz with an on-time of about 1% or more, injecting the reagent via the orifice into the exhaust outlet at an injection rate, and wherein varying of at least two of the inlet pressure, the frequency, and the on-time achieves a turn-down ratio of a maximum injection rate to a minimum injection rate of at least about 31:1.

28 Claims, 6 Drawing Sheets

METHOD AND APPARATUS FOR REDUCING EMISSIONS IN DIESEL ENGINES

CROSS-REFERENCE TO RELATED APPLICATIONS

This application claims priority under 35 §U.S.C. 119(e) to the U.S. Provisional Application No. 60/809,918, filed on May 31, 2006. This application also claims priority under 35 §U.S.C. 120 to U.S. patent application Ser. No. 11/714,718, filed on Mar. 5, 2007, which is a continuation-in-part of U.S. patent application Ser. No. 11/112,039, filed on Apr. 22, 2005, which claims priority under 35 §U.S.C. 119(e) to U.S. Provisional Application No. 60/565,356, filed Apr. 26, 2004.

FIELD OF THE INVENTION

The present invention relates generally to the reduction of emissions produced by lean burn engines. In particular, the present invention provides methods and apparatus for injecting a reagent, such as an aqueous urea solution, into an exhaust stream in order to reduce oxides of nitrogen ("$NO_x$") emissions from diesel engine exhaust. More particularly, the present invention provides a low flow rate injector for diesel emissions control, and methods for injecting a reagent at low flow rates.

BACKGROUND OF THE INVENTION

Lean burn engines provide improved fuel efficiency by operating with an excess of oxygen over the amount necessary for complete combustion of the fuel. Such engines are said to run "lean" or on a "lean mixture." However, this increase in fuel economy is offset by undesired pollution emissions, specifically in the form of oxides of nitrogen ("$NO_x$").

One method used to reduce $NO_x$ emissions from lean burn internal combustion engines is known as selective catalytic reduction ("SCR"). SCR, when used, for example, to reduce $NO_x$ emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust $NO_x$ mass flow. The reagent/exhaust gas mixture is passed through a reactor containing a catalyst, such as, for example, activated carbon, or metals, such as platinum, vanadium or tungsten, which are capable of reducing the $NO_x$ concentration in the presence of the reagent. An SCR system of this type is disclosed in U.S. Pat. No. 5,976,475.

An aqueous urea solution is known to be an effective reagent in SCR systems for diesel engines. However, use of such an aqueous urea solution involves many disadvantages. Urea is highly corrosive and attacks mechanical components of the SCR system, such as the injectors used to inject the urea mixture into the exhaust gas stream. Urea also tends to solidify upon prolonged exposure to high temperatures, such as encountered in diesel exhaust systems. Solidified urea will accumulate in the narrow passageways and exit orifice openings typically found in injectors. Solidified urea may foul moving parts of the injector and clog any openings, rendering the injector unusable.

In addition, if the urea mixture is not finely atomized, urea deposits will form in the catalytic reactor, inhibiting the action of the catalyst and thereby reducing the SCR system effectiveness. High injection pressures are one way of minimizing the problem of insufficient atomization of the urea mixture. However, high injection pressures often result in over-penetration of the injector spray plume into the exhaust stream, causing the plume to impinge on the inner surface of the exhaust pipe opposite the injector. Over-penetration leads to inefficient use of the urea mixture and reduces the range over which the vehicle can operate with reduced $NO_x$ emissions. Only a finite amount of aqueous urea can be carried on a vehicle, and what is carried should be used efficiently to maximize vehicle range and reduce the need for frequent fill ups of the reagent.

The prior art has demonstrated the use of a pulse width modulated, solenoid actuated injector for the injection of a fine spray of urea or hydrocarbon reagents into the exhaust of a diesel engine for $NO_x$ reduction across the appropriate catalyst or for increasing the temperature in the exhaust to regenerate a particulate trap. See for example U.S. Pat. Nos. 5,605,042; 5,976,475 and 6,279,603; and commonly-owned co-pending U.S. Patent Application 2005/0235632 A1. Typically these injectors have been applied to $NO_x$ reduction in large stationary diesel engines used in power generation or to heavy duty on-road or off-road mobile diesel engines such as those used in construction equipment or refuse hauling where large quantities of reagent are required due to the large quantities of $NO_x$ emitted. Typical injection rates from an injector with a 0.012 inch orifice are 36.1 to 103.5 grams/minute ("gr/min") of 32.5% urea solution. Smaller engines such as those used in passenger cars or light duty trucks require smaller volumes of reagent due to their lower levels of $NO_x$ mass emissions. For example injection rates of 0.5-5.0 gr/min would be typical for a light duty application using urea based selective catalytic reduction for $NO_x$ control.

Reducing the orifice size of the injector can provide some reduction in flow rates, as indicated in Table 1 (below) for an injector with a 0.006 inch exit orifice. However even these rates of 3.3-25.5 gr/min are more than is required for many light duty diesel engines. Further reduction in orifice size, while possible, may become impractical from a production perspective due to limits of orifice durability and machineability as the diameter of the exit orifice becomes less than 0.006 of an inch. From a field application perspective, orifices of less than 0.006 inches, and especially below 0.004 inches, require special provisions for filtering of reagents to prevent plugging of the fine orifice with contaminants found in commercial reagents.

SUMMARY OF THE INVENTION

Accordingly, it is an object of the present invention to provide a method and apparatus for reducing emissions from a diesel engine and particularly a small diesel engine such as the types used in passenger cars, light duty trucks, and off-road vehicles or equipment.

It is a further object of the present invention to provide a method for reducing emissions from a diesel engine using a reagent injector with a low flow rate and a high turn-down ratio (i.e., ratio between maximum injector flow rate and minimum injector flow rate).

It is a further object of the present invention to provide a method for reducing emissions from a diesel engine using a reagent injector with a flow rate that may be adjusted by electronically modifying the frequency and/or percent on time (pulse width) so as to achieve low flow rates of a reagent, especially in the range of 0.5 gr/min to 5 gr/min.

It is a further object of the present invention to provide such an apparatus with the ability to achieve higher flow rates of reagent in excess of 25 gr/min.

These and other objectives are achieved by providing a method of reducing emissions from a diesel engine including the steps of providing an injector to an exhaust outlet of the diesel engine, the injector having an orifice with a diameter of about 0.006 inch or less, providing a reagent to the injector at an inlet pressure between about 120 psi and about 60 psi, actuating the injector on and off at a frequency between about 10 Hz and about 1 Hz (e.g., 0.5 Hz) with an on-time of about 1% or more, injecting the reagent via the orifice into the exhaust outlet at an injection rate, and wherein varying at least two of the inlet pressure, the frequency, and the on-time achieves a turn-down ratio of a maximum injection rate to a minimum injection rate of at least about 31:1.

Other objects are achieved by provision of a method of reducing emissions from a diesel engine including the steps of providing a reagent injector in communication with an exhaust outlet of the diesel engine, the injector having an orifice with a diameter less than about 0.035 inch, providing a reagent to the injector at an inlet pressure, actuating the injector on and off at a frequency to inject the reagent via the orifice into the exhaust outlet at an injection rate, adjusting an on-time of the injector between about 85% and about 5%, adjusting the inlet pressure between a first inlet pressure and a second inlet pressure, wherein the steps of adjusting the on-time and adjusting the inlet pressure achieve a turn-down ratio of a maximum injection rate to a minimum injection rate greater than 10:1. In some embodiments, the method includes adjusting the frequency between a first frequency of about 10 Hz and a second frequency of about 1.5 Hz and adjusting the on-time to about 1% or less to achieve a turn-down ratio of at least about 50:1.

Further provided is a method of reducing emissions from a diesel engine including the steps of providing a reagent injector to an exhaust outlet of the diesel engine, the injector having an orifice with a diameter not greater than about 0.006 inch, supplying a reagent to the injector at an inlet pressure of about 80 psi or less, actuating the injector on and off at a frequency not greater than about 1.5 Hz, wherein the actuator injects the reagent via the orifice into the exhaust outlet at an injection rate of about 3.3 grams/minute or less, and wherein the injector has an on-time less than 10.5%. In some exemplary embodiments, the injector has an on-time less than 5% and the actuating injects the reagent via the orifice into the exhaust outlet at an injection rate of about 1.5 grams/minute or less. In some exemplary embodiments, the injector has an on-time of about 1% or less and the actuating injects the reagent via the orifice into the exhaust outlet at an injection rate of about 0.8 grams/minute or less.

Other objects of the invention and its particular features and advantages will become more apparent from consideration of the following drawings and accompanying detailed description.

BRIEF DESCRIPTION OF THE DRAWINGS

The present invention will hereinafter be described in conjunction with the appended drawing figures, wherein like numbers denote like elements, and.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an exemplary embodiment of the invention. It should be understood that various changes may be made in the function and arrangement of elements without departing from the spirit and scope of the invention as set forth in the appended claims.

The present invention provides a low flow rate injector for diesel emissions control, and methods for injecting a reagent at low flow rates.

The present invention achieves lower flow rates in a commercial injector of the type disclosed in commonly owned co-pending U.S. patent application Ser. No. 11/112,039 entitled Methods and Apparatus for Injecting Atomized Fluid, filed on Apr. 22, 2005 (U.S. Published Application No. 2005/0235632 A1), which is incorporated herein and made a part hereof by reference, as if fully set forth herein.

Figure 1:
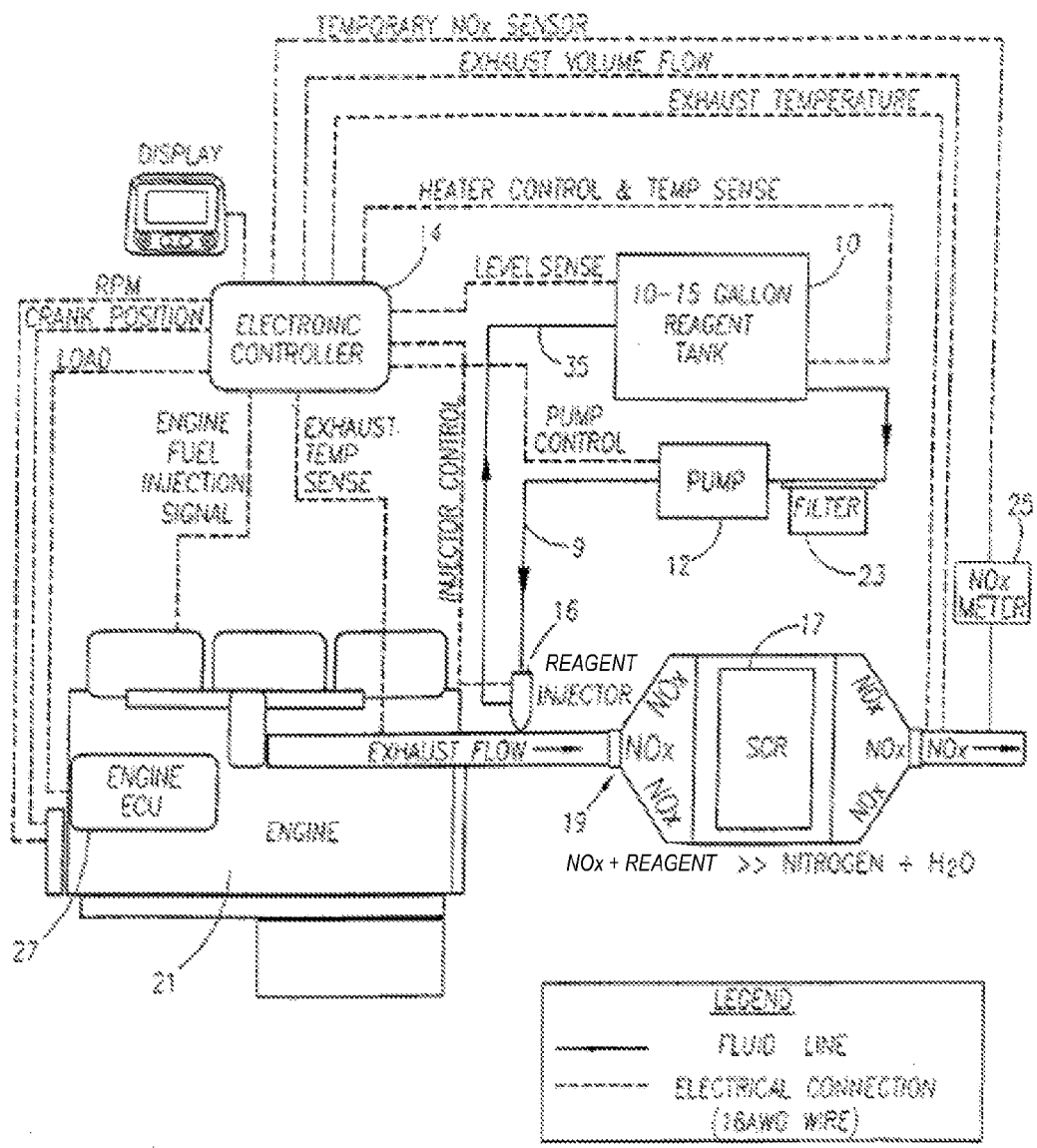
FIG. 1 shows a schematic diagram of an exemplary embodiment of an on-road diesel engine with a pollution emission control system using an injector according to the present invention.

FIG. 1 shows an example pollution control system for reducing $NO_x$ emissions from the exhaust of a diesel engine 21. In FIG. 1, solid lines between the elements of the system denote fluid lines and dashed lines denote electrical connections. The system of the present invention may include reagent tank 10 for holding the reagent and a delivery module 12 for delivering the reagent from the tank 10. The reagent may be, for example, aqueous urea, hydrocarbons, water, and/or other fluids. The tank 10 and delivery module 12 may form an integrated reagent tank/delivery module. Also provided as part of the system is an electronic injection control unit 14, an injector module 16, and an exhaust system 19 having at least one catalyst bed 17.

The delivery module 12 may comprise a pump that is supplied reagent from the tank 10 through an in-line filter 23 via a supply line 9. The reagent tank 10 may be polypropylene, epoxy coated carbon steel, PVC, or stainless steel and sized according to the application (e.g., vehicle size, intended use of the vehicle, and the like). The filter 23 may include a housing constructed of rigid plastic or stainless steel with a removable cartridge. A pressure regulator (not shown) may be provided to maintain the system at predetermined pressure setpoint (e.g., approximately 60 psi) and may be located in the return line 35 from the injector 16. A pressure sensor may be provided in the flexible line leading to the reagent injector 16. The system may also incorporate various freeze protection strategies to unthaw frozen urea or to prevent the urea from freezing. For example, during system operation, regardless of whether or not the injector is releasing reagent into the exhaust gases, reagent is circulated continuously between the tank 10 and the injector 16 to cool the injector and minimize the dwell time of the reagent in the injector so that the reagent remains cool. Continuous reagent circulation is necessary for temperature-sensitive reagents, such as aqueous urea, which tend to solidify upon exposure to elevated temperatures of 300° C. to 650° C. as would be experienced in an engine exhaust system. It has been found to be important to keep the urea mixture below 140° C. and preferably in a lower operating range between 5° C. and 95° C. to provide a margin of safety ensuring that solidification of the urea is prevented. Solidified urea, if allowed to form, would foul the moving parts and openings of the injector, eventually rendering the injector useless. It will be recognized that flow rates will depend on engine size and $NO_x$ levels.

The amount of reagent required may vary with load, engine RPM, engine speed, exhaust gas temperature, exhaust gas flow, exhaust back pressure, engine fuel injection timing, and desired $NO_x$ reduction. All or some of the engine operating parameters may be supplied from the engine control unit 27 via the engine/vehicle data bus to the reagent injection controller 14. The reagent injection control unit 14 could also be included as part of the engine control unit 27 if the truck manufacturer agrees to provide that functionality.

Exhaust gas temperature, exhaust gas flow and exhaust back pressure may be measured by respective sensors.

A minimum reagent level switch or programmed logic based on voltage may be used to prevent the injection system from running dry and overheating. Once a minimum reagent level in the tank 10 is reached, injection will cease and a fault light and/or a text alarm will illuminate in the cab of the vehicle.

The injection rate may be set by programming the reagent injection control unit 14 with an injection control strategy or map, as described in commonly owned U.S. Pat. No. 6,941,746 issued on Sep. 13, 2005 entitled "Mobile Diesel Selective Catalytic Reduction Systems and Methods" which is incorporated herein and made a part hereof by reference. As described therein, the injection strategy may be developed by temporarily installing a $NO_x$ detector 25 on the vehicle. The $NO_x$ detector 25 may be a sensor or a meter with a sampling system. FIG. 1 shows a $NO_x$ meter 25 which analyzes the gas concentration or mass at a location external to the exhaust system 19.

Figure 2:
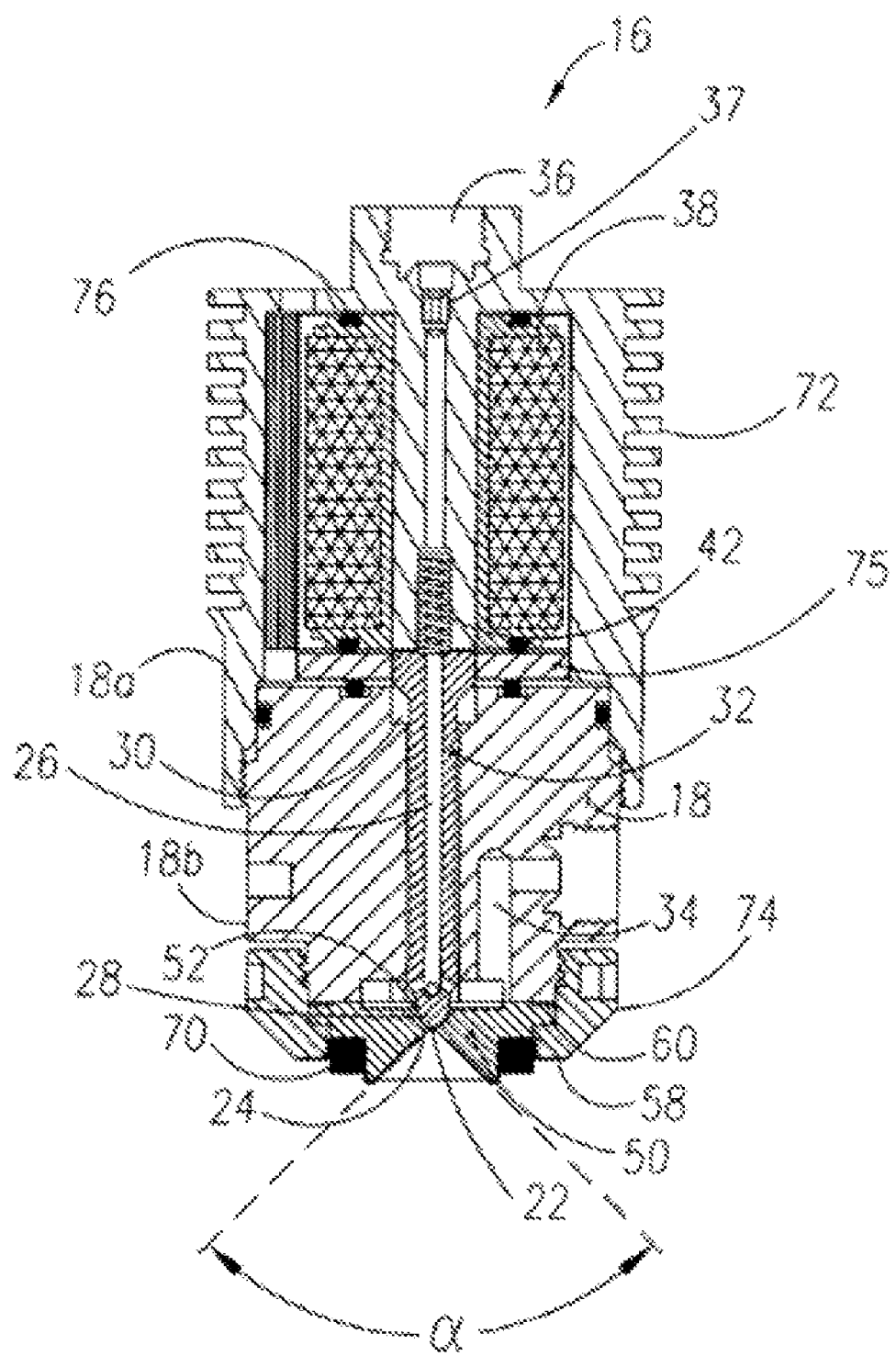
FIG. 2 shows a longitudinal cross-sectional view of an exemplary embodiment of an injector used in the system of FIG. 1.

FIG. 2 shows a cross-sectional view of an exemplary embodiment of the injector 16 according to the present invention, which may be used in the system shown in FIG. 1. Injector 16 may comprise an injector body 18 having an upper section 18a and a lower section 18b. An elongated cylindrical chamber 30 may be disposed within the injector body 18. The chamber 30 may be in fluid communication with a whirl plate 50, which has an exit orifice 22 that opens onto the exhaust gases within the exhaust system 19 (FIG. 1) of a diesel engine when mounted thereon. Surrounding exit orifice 22 may be a valve seat 24 which can have any practical shape but is preferably conical. A valve member in the form of an elongated metering plug 26 may be slidably mounted within the chamber 30.

Figure 3A:
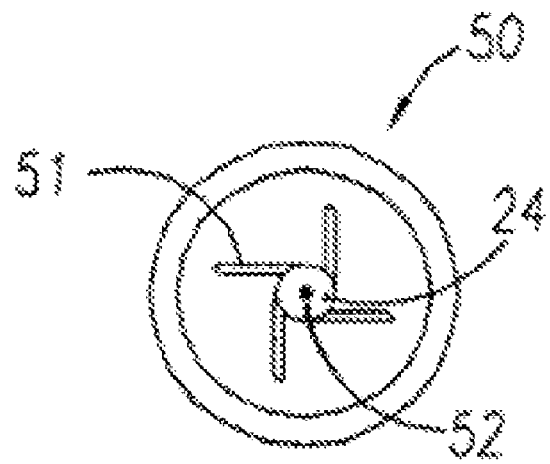
FIG. 3A shows a top view of an exemplary embodiment of a whirl plate portion of the injector of FIG. 2.
Figure 3B:
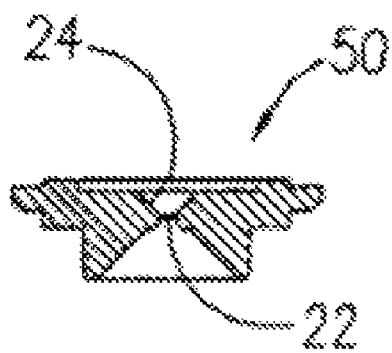
FIG. 3B shows a cross-sectional view of an exemplary embodiment of a whirl plate portion of the injector of FIG. 2.
Figure 3C:
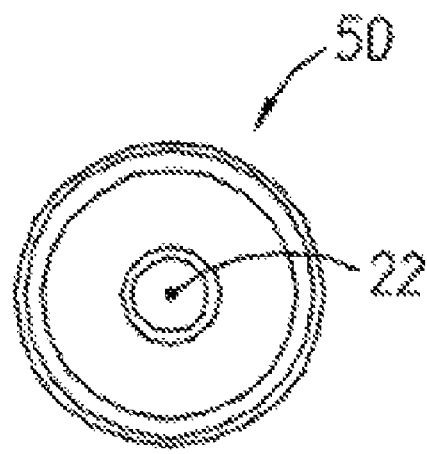
FIG. 3C shows a bottom view of an exemplary embodiment of a whirl plate portion of the injector of FIG. 2.

FIG. 3A shows a top view of the whirl plate 50. FIG. 3B shows a cross-sectional view of the whirl plate 50. FIG. 3C shows a bottom view of the whirl plate 50. As can be seen from FIG. 3A, the whirl plate 50 may include a plurality of whirl slots 51 surrounding the valve seat 24 and forming a whirl chamber 52 in the area surrounding the end 28 of the metering plug 26 (see FIG. 2). As can be seen from FIGS. 3A and 3B, the valve seat 24 surrounds the exit orifice 22 for dispensing the atomized fluid from the whirl chamber 52. The whirl plate 50 may be affixed to the lower section of the injector body 18b by a retaining cap 74 (as shown in FIG. 2).

In the example configuration shown in FIG. 2, a fluid-retaining gasket 60 may be interposed between the whirl plate 50 and the lower portion of the injector body 18b to prevent fluid from leaking between the mating surfaces of the whirl plate 50, injector body 18 and retaining cap 74. The gasket may comprise a silicone material. The upper injector body 18a may include several sealing O-Rings 76 interposed between mating surfaces of the upper injector body 18a and lower injector body 18b, lower injector body 18b and bottom plate 75, bottom plate 75 and coil 38, and coil 38 and upper injector body 18a to prevent fluid leaks.

Figure 4A:
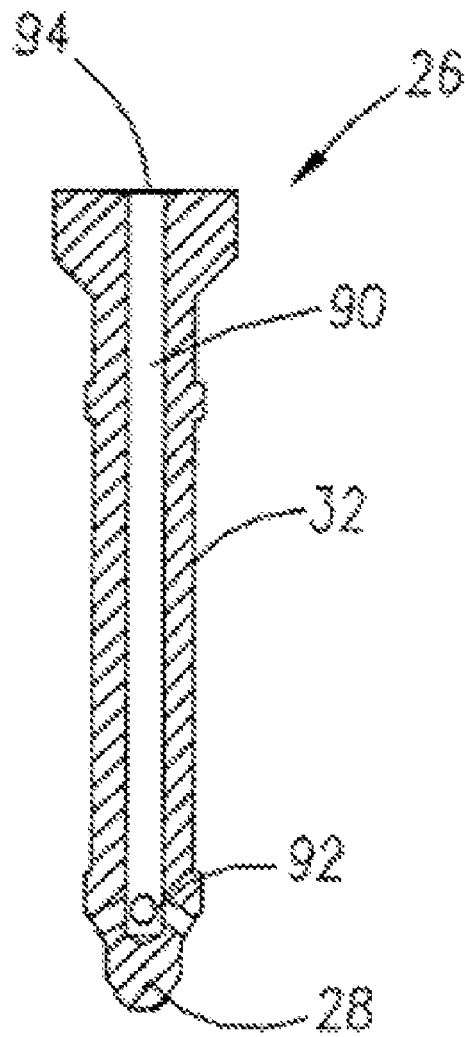
FIG. 4A shows an exemplary embodiment of a metering plug used in the injector of FIG. 2.
Figure 4B:
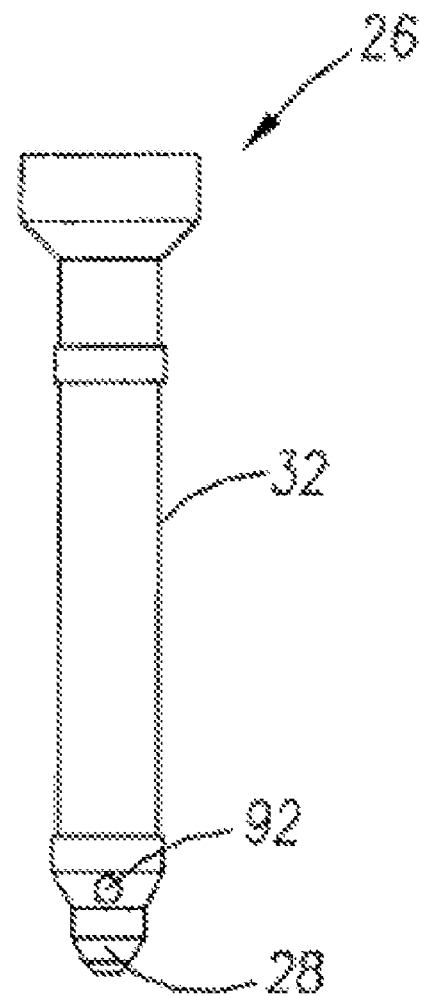
FIG. 4B shows another view of the metering plug shown in FIG. 4A.

FIGS. 4A and 4B show cross-section and exterior views, respectively, of an exemplary embodiment of metering plug 26. Metering plug 26 may have an end 28 formed to sealingly engage valve seat 24, thereby closing exit orifice 22 from fluid communication with the whirl chamber 52. Metering plug 26 may be movable within the whirl chamber 52 between the closed position shown in FIG. 2 and an open position wherein end 28 is removed from sealing engagement with valve seat 24. In the open position, exit orifice 22 is opened to fluid communication with the whirl chamber 52.

Fluid may be delivered to the whirl chamber 52 via a fluid inlet 34 (FIG. 2). Fluid inlet 34 may be in fluid communication with the whirl chamber 52 and may be externally connected to tank 10 via supply line 9. Fluid, such as aqueous urea reagent, may be pumped at a predetermined pressure setpoint into the fluid inlet 34 and into the whirl chamber 52. The pressurized fluid may be accelerated to high velocity in the whirl slots 51. This produces a high velocity rotating flow in the whirl chamber 52. When the end 28 of the metering plug is removed from the valve seat 24, a portion of the rotating flow of fluid is passed through exit orifice 22, where atomization occurs from a combination of centrifugal force and shearing of the fluid by air as it jets into the exhaust stream.

The predetermined pressure setpoint may vary in response to operating conditions to provide at least one of increased operating range and varied spray patterns from the exit orifice 22.

To effect the opening and closing of the exit orifice 22, an actuator may be provided, for example in the form of magnetic coil 38 mounted in the injector body 18. When the magnet 38 is energized, the metering plug 26 is drawn upward from the closed position to the open position. The bottom plate 75 and the upper injector body 18a may be constructed of magnetic stainless steel to provide a magnetized surface while retaining the corrosion resistant characteristics. The bottom injector body 18b may be constructed of a non-magnetic stainless steel such as type 316 stainless steel. This enhances the isolation of the magnetic characteristic at the bottom plate 75 and limits the potential for the metering plug 26 to be magnetized toward the exit orifice 22. The magnet would be energized, for example, in response to a signal from electronic controller 14 of FIG. 1, which decides, based upon sensor input signals and its preprogrammed algorithms, when reagent is needed for effective selective catalytic reduction of $NO_x$ emissions in the exhaust stream.

Figure 5:
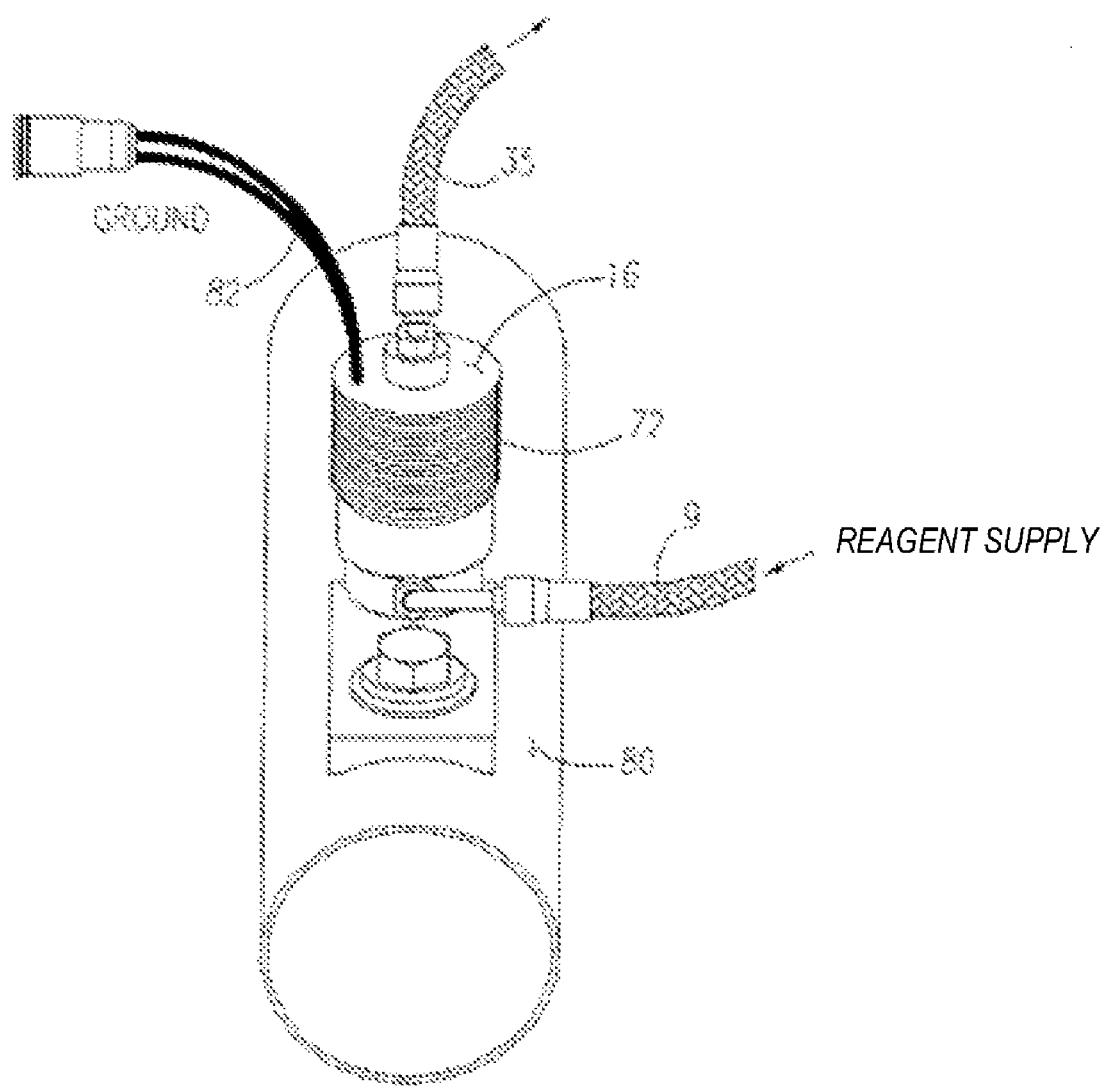
FIG. 5 shows a perspective view of an exemplary embodiment of an injector used in the system of FIG. 1 mounted on an exhaust tube in accordance with the present invention.

FIG. 5 shows an external view of the injector 16 connected to an exhaust tube 80. Electrical connections 82 may be provided for providing a control signal to the injector 16, for example from the reagent injection controller 14 (FIG. 1). The magnetic coil 38 may be energized by a 12-24 VDC current with a pulse width modulated digital signal.

As shown in FIG. 4A, the metering plug 26 includes a hollow section 90 which may be in fluid communication with the whirl chamber 52 via bores 92 in the metering plug 26. The pressurized fluid from the whirl chamber 52 which is not expelled from exit orifice 22 may be forced into bores 92, into the hollow section 90 and ultimately into outlet 36 through the hollow top portion 94 of the metering plug 26. The fluid outlet 36 may be positioned as shown in FIG. 2 for removing fluid from the top portion 94 of the hollow section 90 of metering plug 26. Fluid outlet 36 may be externally connected to return line 35 (FIG. 5), thus permitting the fluid to circulate from the tank 10 of FIG. 1, through supply line 9, through fluid inlet 34, into the whirl chamber 52, through bores 92, through the hollow section 90 of metering plug 26, out of hollow top portion 94 and into fluid outlet 36, through return line 35 and back into tank 10 of FIG. 1. This circulation keeps the injector 16 cool and minimizes the dwell time of the fluid in the injector. The fluid inlet 34, fluid outlet 36, and the hollow portion 90 of the metering plug 26 may provide a flow path for fluid flowing through the injector 16, thereby enabling cooling of the injector 16. The flow path for fluid through the injector 16 may be independent of the position of the metering plug 18. A metering orifice 37 may be provided for controlling the amount of cooling fluid flowing through the injector 16.

Thus, for example, aqueous urea, when used with this cooled injector 16, will not solidify anywhere within the injector 16, and in particular in the area of the whirl chamber 52. If allowed to solidify, the urea could prevent metering plug 26 from seating properly or could cause the metering plug 26 to seize in either the open or closed position and/or the exit orifice 22 could become clogged. In addition, the detrimental effects of elevated temperature on the reagent, the moving parts, and the openings of the valve are avoided. For example, by directly cooling the injector, increased performance is achieved in comparison with the prior art, which provides cooling only in the region of the valve seat. Further, the increased cooling provides for prolonged life of the injector components, including the metering plug 26 and associated actuating components, and the valve seat 24. Cooling ribs 72 provided on the exterior of the upper portion of the injector body 18a provide additional cooling capacity.

As an example, approximately 10 gallons of fluid may be circulated through the injector per hour. This flow rate may be varied depending on the application. Upon removing the end 28 of the metering plug 26 from the valve seat 24, atomized fluid may be expelled at the rate of approximately 3-500 grams per minute, depending on the application and/or the control algorithm used. As discussed below, flow rates much less than 3 gr/min, e.g., as low as about 0.2 gr/min, may also be achieved by methods according to the present invention.

The spray characteristics of fluid expelled from the exit orifice 22 may be varied depending on the pressure ratios of the pressure maintained in the return and supply lines. For example, the size of the droplets may be controlled by varying the pressure in the supply line 9. In addition, the spray characteristics may be varied by interchanging different spray plates. For example, the spray plate 50, which is affixed to the injector body by retaining cap 74, may be removed and replaced with spray plates with different sized exit orifices 22, a different number of whirl slots 51, or whirl slots of different length, depth or width. Further, spray plates may be configured to provide larger or smaller whirl chambers 52 when affixed to lower section of the injector body 18a. The fluid circulation rate can also be varied by modifying the internal diameter of metering orifice 37. Varying the fluid circulation rate changes the droplet size and impacts the level of cooling provided by the fluid.

A circular guide section 32 of the metering plug 26 may provide the main guiding function for sliding motion of the metering plug 26 within the chamber 30. The tolerance between the circular guide section 32 and the chamber 30 is sufficient to allow relative motion and lubrication of the metering plug 26 while still guiding the metering plug's motion.

Generally the specific tolerances required at the various sections between the metering plug 26 and the chamber 30 will vary according to the operating temperature, operating pressure, the desired flow rate and circulation rate of the reagent, the tribological properties of the reagent and the materials chosen for the metering plug 26 and injector body 18. The tolerances for optimum injector performance may be obtained experimentally through field trials.

As shown in FIG. 2, metering plug 26 may be biased in the closed position by a biasing member, which may be, for example, in the form of a coil spring 42 coaxially arranged with the hollow top portion 94 of the metering plug 26, which serves as a spring seat against which the spring 42 can push to bias the metering plug 26.

In the configuration shown, a thermal shield 58 may be mounted externally to the whirl plate 50 and retaining cap 74 prevents heat from the exhaust gases from being transferred to the whirl plate 50 and injector body 18 while simultaneously providing a heated surface ensuring that droplets unintentionally contacting the injector body do not form deposits. For example, the thermal shield 58 may be made of inconel. Alternatively, the exit orifice 22 may be moved to the outside or injecting end of the whirl plate 50, thereby increasing spray angle α and also allowing a wider range of spray angles while retaining the cooling properties. Thermal gasket 70 may be made of a flexible graphite foil sheathed in stainless steel material whose low thermal conductivity serves to isolate injector body 18 and the whirl plate 50 from the hot exhaust tube 80, reducing conductive heat transfer to the injector 16 and thereby helping to keep the fluid circulating within the valve cool.

The metering plug 26 may be made of type 430C or 440F stainless steel preferably coated with a coating that retains the urea corrosion resistance and the magnetic properties while reducing the metal fatigue caused over the life of the injector. The whirl plate 50 may be made of inconel or type 316 stainless steel and coated with a coating that retains the urea corrosion resistance while reducing the metal fatigue caused over the life of the injector 16. The bottom plate 75 may be separated from the metering plug 26 and the metering plug 26 may be shortened to the shortest length reasonable for manufacturing to provide a significantly reduced metering plug mass. The decreased mass of the metering plug 26 prolongs the life of the plug, and in particular prolongs the life of the end 28 of the metering plug, which is subject to wear and deformation from repeated impact on the valve seat 24.

The injector 16 of the present invention may have an exit orifice 22 with a diameter of approximately 0.006 of an inch. The present invention achieves lower flow rates in an injector 16 having a 0.006 inch exit orifice 22 by adjusting the frequency and percent on time from 10 Hz to approximately 1.5 Hz and down to approximately 1-10% on time (e.g., via the reagent injection controller 14 (FIG. 1)). It should be appreciated that the 0.006 inch exit orifice diameter dimension is provided for purposes of example only, and low flow rates can be achieved with other exit orifice sizes, for example exit orifices having a diameter within the range of approximately 0.004" to 0.035".

The flow rate of reagent injected achieved with the present invention may range from approximately 0.2 gr/min up to 25 gr/min or more. By varying the selection of orifice size, frequency of injection, inlet pressure, and/or duration of injection (e.g., on-time), a range of injection rates from less than 0.5 gr/min to up to 900 gr/min may be achieved in accordance with the present invention.

For example, one embodiment according to the present invention achieves ultra low flow rates of approximately 0.8 gr/min to 5.5 gr/min of a reagent (e.g., urea in a 32% solution in water) at a frequency of approximately 1.5 Hz and a 1% to 10.4% on time as shown in Table 2.

TABLE 1

0.006" orifice @ 10 Hz

| | Injector % on time: | | | |
|---|---|---|---|---|
| | 5% | 20% | 50% | 80% |
| Urea Injected grams/min (32% solution): | 3.3 | 7.8 | 16.5 | 25.5 |

TABLE 2

0.006" orifice @ 1.5 Hz

| | Injector % on time: | | |
|---|---|---|---|
| | 1% | 4.2% | 10.4% |
| Urea Injected grams/min (32% solution): | 0.8 | 1.5 | 3.3 |

Figure 6:
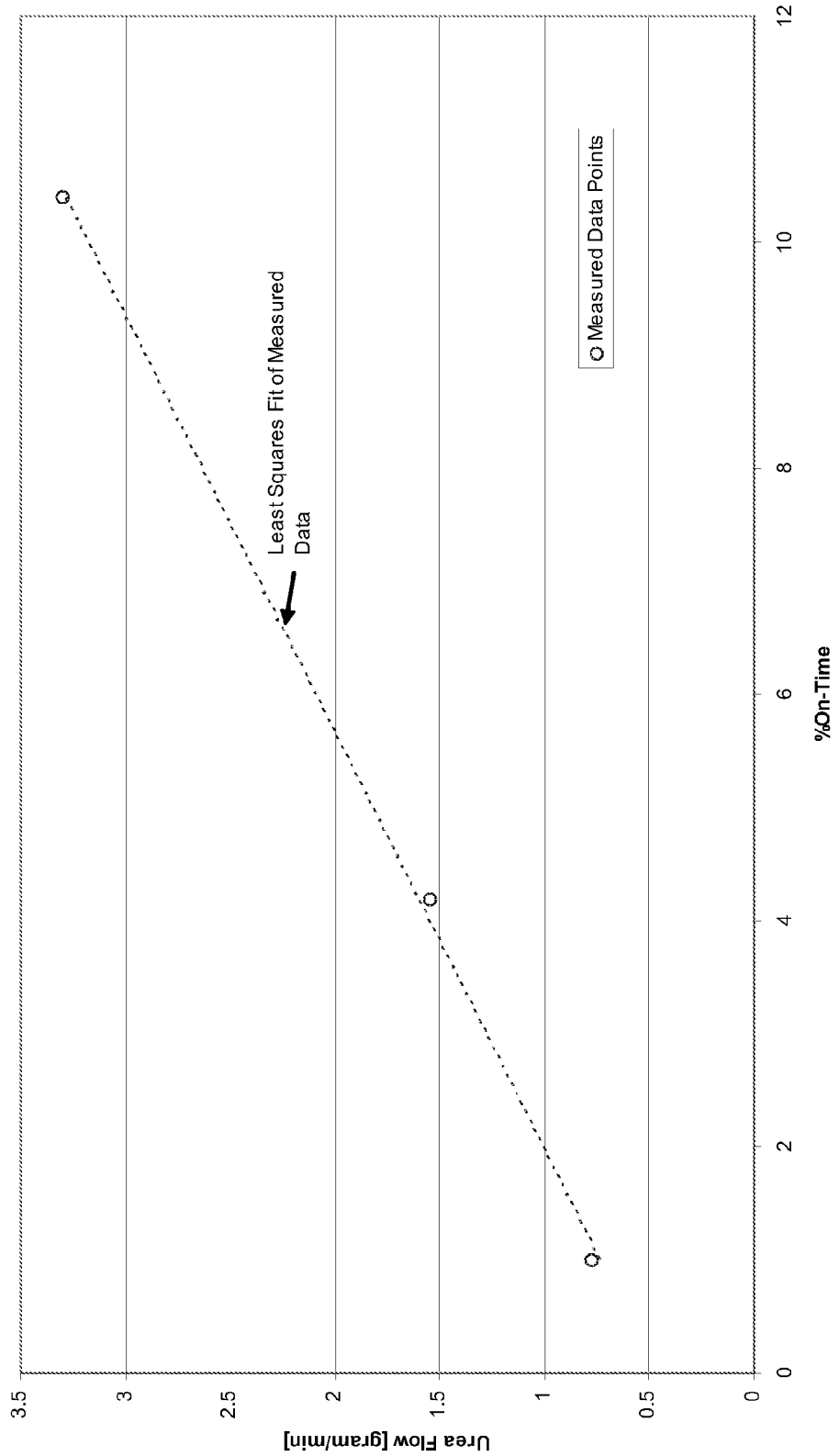
FIG. 6 shows a graph of an exemplary reagent flow rate versus % on time in accordance with the present invention.

FIG. 6 shows a graph of urea flow rate versus % on time achieved with the present invention where the injector pulse-width modulation frequency is set to 1.5 Hz (rather than 10 Hz). As can be seen from FIG. 6, the flow rate achieved with the present invention at 1.5 Hz is a linear flow rate, even with an on time of below 5%. Such a linear result was surprising and unexpected, since at 10 Hz, the flow rate can become nonlinear when the injector on time is reduced below 5%.

The following describes four exemplary methods of using low flow rate injectors according to the present invention to reduce emissions from a diesel engine. In a first example, a return flow injector with a 0.030 orifice is initially operated at 120 psi reagent pressure and a frequency of 10 Hz and provides a maximum injection rate of 631.0 gr/min (e.g., using a Viscor test fluid). The injector has a minimum flow rate of 68.0 gr/min at a pressure of 120 psi. Dropping the injection pressure to 80 psi reduces the minimum flow rate to 58.8 gr/min. Thus a maximum turn-down in injection rate of 631.0 gr/min to 58.8 gr/min is possible, resulting in a 10.7:1 turn-down ratio.

However, by also changing the frequency of operation to 1.5 Hz, the minimum on-time for injector operation may be reduced to 1% resulting in a minimum injection rate of 12.6 gr/min at 80 psi. Thus a combination of the above operating features of the injector can be used to provide a surprisingly high turn-down from 631.0 gr/min to 12.6 gr/min; or a 50:1 turn-down.

In a second example, an injector with a 0.006 orifice has an operating injection range of 3.6 gr/min at its lowest operating point corresponding to 5% on time, and a maximum injection rate of 25.6 gr/min at 100% on time when flowing water at 80 psi and operated at 10 Hz frequency. Changing the frequency to 1.5 Hz allows the low end operating rate to be dropped to 1% on time with a corresponding low end flow of 0.6 gr/min at 80 psi. Thus the overall turn-down range at a constant pressure of 80 psi is about 43:1.

In a third example, an injector slot area for a 0.005 orifice injector operated at 50% on time, 80 psi and 10 Hz is selected to maintain a droplet size of less than 100 micron SMD (Sauter Mean Diameter) and provide cooling of the injector at low return flow rates of 2.6-7.5 gallons per hour ("gph"). Lower circulation and return rates are beneficial in reducing power requirements for pumping yet must provide adequate velocity in the swirl chamber to maintain droplet size and maintain cooling of the injector. It was therefore found to be desirable to have overall reagent circulation rates such that the return flow rate through the injector is greater than the amount of reagent injected. Table 3 illustrates data generated by the third exemplary application.

TABLE 3

| Return Flow (GPH) | Average SMD ($\mu$) |
|---|---|
| 1.3 | 127.7 |
| 2.6 | 99.1 |
| 4.1 | 88.0 |
| 5 | 76.8 |
| 7.5 | 72.8 |

In a fourth example, a 0.005 orifice injector is operated at 1% on time and 1 Hz frequency on water and provides a low end injection rate of 0.2 gr/min at 60 psi operating pressure and 0.35 gr/min at a 120 psi operating pressure with a maximum injection rate of 20.5 gr/min at 120 psi and 100% on time. This provides a turn-down ratio of 100:1. When operated at 10 Hz and a pressure of 120 psi the minimum on time is 5% and the minimum injection rate is 2.2 gr/min. Thus the ability to adjust frequency of operation from 10 Hz to 1 Hz was found to substantially improve turn-down range alone and in combination with variation in the pressure set point.

In this embodiment, particle size data surprisingly showed that droplet size appears to be independent of on-time and frequency. Only supply pressure was found to significantly alter droplet size. Droplet size averaged 69 micron SMD at 80 psi, 77 micron SMD at 60 psi and 56 micron at 120 psi.

It should now be appreciated that the present invention advantageously enables low flow rate and maximum turn-down in flow rate by adjusting the frequency and percent on time (pulse width) of a commercial single fluid pulse width modulated reagent injector such as that used in the reduction of $NO_x$ emissions from diesel engines.

Although the invention has been described in connection with various illustrated embodiments, numerous modifications and adaptations may be made thereto without departing from the spirit and scope of the invention as set forth in the claims.

What is claimed is:

1. A method of reducing emissions from a diesel engine, comprising the steps of:

providing an injector to an exhaust outlet of the diesel engine, the injector having an orifice with a diameter of about 0.006 inch or less;

providing a reagent to the injector at an inlet pressure between about 120 psi and about 60 psi;

actuating the injector on and off at a frequency between about 10 Hz and about 1 Hz with an on-time of about 1% or more;

injecting the reagent via the orifice into the exhaust outlet at an injection rate; and wherein varying at least two of the inlet pressure, the frequency, and the on-time achieves a turn-down ratio of a maximum injection rate to a minimum injection rate of at least about 31:1.

2. The method according to claim 1, wherein the injection rate is between about 0.2 grams/minute and about 25 grams/minute.

3. The method according to claim 1, wherein the reagent includes at least one of a urea solution and a hydrocarbon solution.

4. The method according to claim 1, wherein the at least two consists of the frequency and the on-time.

5. The method according to claim 4, further comprising the step of:
maintaining a constant inlet pressure of about 80 psi.

6. The method according to claim 1,
wherein the diameter is 0.005 inch or less; and
wherein varying each of the inlet pressure, the frequency, and the on-time achieves a turn-down ratio of at least 100:1.

7. The method according to claim 1, further comprising the step of:
adjusting the inlet pressure until the reagent is injected with droplet sizes between about 40μ and about 100μ SMD.

8. The method according to claim 1, wherein the reagent is provided to the injector from a reagent tank, wherein the method further includes a step of recirculating at least a portion of the reagent back to the reagent tank.

9. The method according to claim 8, wherein a recirculation flow rate is greater than the injection rate.

10. The method according to claim 1, wherein the reagent is provided at a flow rate between about 2.5 gallons/hour and about 10 gallons/hour.

11. The method according to claim 10, wherein the minimum injection rate is about 0.2 grams/minute and the maximum injection rate is about 25 grams/minute.

12. The method according to claim 1, wherein the reagent is provided at a flow rate between about 7 gallons/hour and about 25 gallons/hour.

13. The method according to claim 12, wherein the minimum injection rate is about 20 grams/minute and the maximum injection rate is about 600 grams/minute.

14. A method of reducing emissions from a diesel engine, comprising the steps of:
providing a reagent injector in communication with an exhaust outlet of the diesel engine, the injector having an orifice with a diameter less than about 0.035 inch;
providing a reagent to the injector at an inlet pressure;
actuating the injector on and off at a frequency to inject the reagent via the orifice into the exhaust outlet at an injection rate;
adjusting an on-time of the injector between about 85% and about 5%;
adjusting the inlet pressure between a first inlet pressure and a second inlet pressure;
wherein said steps of adjusting the on-time and adjusting the inlet pressure achieve a turn-down ratio of a maximum injection rate to a minimum injection rate greater than 10:1.

15. The method according to claim 14,
wherein the diameter is about 0.03 inch or less; and
wherein maximum injection rate is about 800 grams/minute.

16. The method according to claim 14, further comprising the step of:
adjusting the frequency between a first frequency of about 10 Hz and a second frequency of about 1.5 Hz and adjusting the on-time to about 1% or less to achieve a turn-down ratio of at least about 50:1.

17. The method according to claim 16, wherein the first inlet pressure is about 120 psi and the second inlet pressure is about 80 psi.

18. The method according to claim 17,
wherein the orifice diameter is 0.005 inch or less; and
wherein the turn-down ratio is at least about 100:1.

19. The method according to claim 14, wherein the first inlet pressure is about 120 psi and the second inlet pressure is about 60 psi.

20. The method according to claim 14, wherein the first inlet pressure is about 140 psi and the second inlet pressure is about 40 psi.

21. The method according to claim 14, wherein the turn-down ratio is at least about 43:1.

22. A method of reducing emissions from a diesel engine, comprising the steps of:
providing a reagent injector to an exhaust outlet of the diesel engine, the injector having an orifice with a diameter not greater than about 0.006 inch;
supplying a reagent to the injector at an inlet pressure of about 80 psi or less;
actuating the injector on and off at a frequency not greater than about 1.5 Hz;
wherein said actuating injects the reagent via the orifice into the exhaust outlet at an injection rate of about 3.3 grams/minute or less; and
wherein the injector has an on-time less than 10.5%.

23. The method according to claim 22,
wherein the injector has an on-time less than 5%; and
wherein said actuating injects the reagent via the orifice into the exhaust outlet at an injection rate of about 1.5 grams/minute or less.

24. The method according to claim 22,
wherein the injector has an on-time of about 1% or less; and
wherein said actuating injects the reagent via the orifice into the exhaust outlet at an injection rate of about 0.8 grams/minute or less.

25. The method according to claim 22, wherein the frequency is 1.0 Hz or less.

26. The method according to claim 22, wherein the injection rate is between about 0.2 grams/minute and about 3 grams/minute.

27. The method according to claim 22, wherein the on-time is about 1% or less.

28. The method according to claim 22, wherein the reagent includes at least one of a urea solution and a hydrocarbon solution.

* * * * *